United States Patent [19]

Brown, Jr. et al.

[11] 4,054,163
[45] Oct. 18, 1977

[54] TIRE INFLATOR

[75] Inventors: Robert K. Brown, Jr., Sandusky; Richard L. Merrell, Huron, both of Ohio

[73] Assignee: General Motors Corporation, Detroit, Mich.

[21] Appl. No.: 678,155

[22] Filed: Apr. 19, 1976

[51] Int. Cl.² .............................................. B65B 3/04
[52] U.S. Cl. .................... 141/291; 141/302; 137/71; 220/89 A
[58] Field of Search ................... 141/38, 360, 346–366, 141/92, 285, 291–296, 301, 302; 137/223, 68 R, 71; 220/89 A

[56] References Cited

U.S. PATENT DOCUMENTS

| 765,022 | 7/1904 | Loewenstein et al. | 141/38 |
| 2,498,596 | 2/1950 | Wallach | 141/38 |
| 2,557,807 | 6/1951 | Wagner | 141/38 |
| 2,575,908 | 11/1951 | Clifford | 141/38 |
| 2,786,333 | 3/1957 | Marara | 141/38 |
| 3,448,779 | 6/1969 | Horwitt | 141/38 |
| 3,482,732 | 12/1969 | Davis | 137/68 R |

Primary Examiner—Houston S. Bell, Jr.
Attorney, Agent, or Firm—Herbert Furman

[57] ABSTRACT

A tire inflator includes a pressure vessel filled with non-flammable compressed gas. A tubular valve housing is secured within the inflator outlet and includes radial ports opening to the bore of the housing and located adjacent an outer apertured end wall. A tubular valve body is slidable within the housing bore and includes a conventional tire valve. The inner ends of the housing and valve body each include a slightly raised rib in concentric relationship. A rupturable diaphragm secured to the ribs locates the valve body relative to the housing and seals the space therebetween. Over pressure in the vessel ruptures the diaphragm between the valve body and housing and moves the valve body outwardly into engagement with the end wall of the housing. The pressure fluid within the pressure vessel escapes to atmosphere through the space between the valve body and housing and through the radial ports.

2 Claims, 1 Drawing Figure

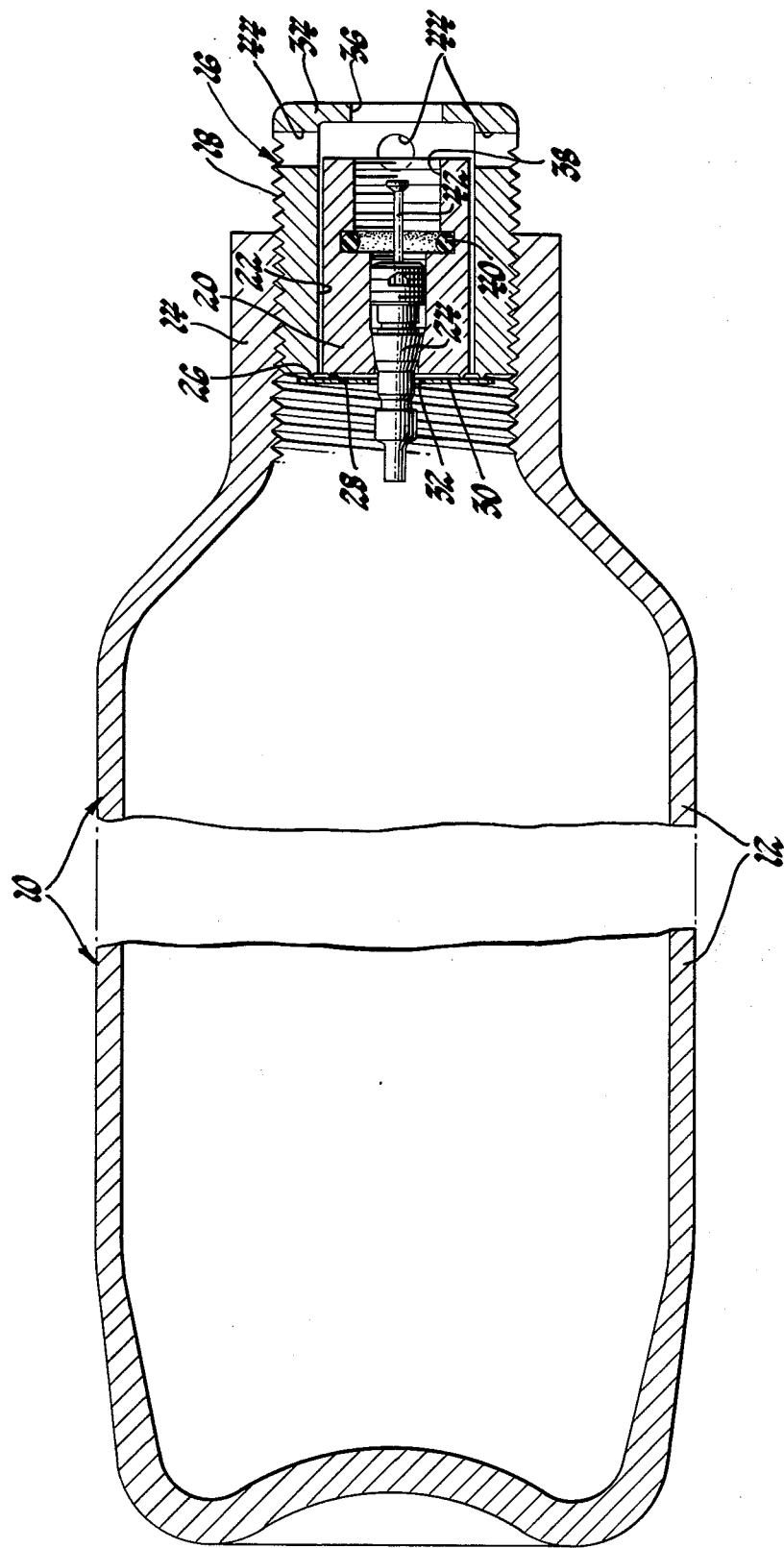

TIRE INFLATOR

This invention relates generally to tire inflators and more particularly to a combined tire fill and over pressure relief valve assembly for a tire inflator.

Tire inflators are well known. Generally these tire inflators include a pressure vessel containing suitable compressed gas, such as Freon or carbon dioxide, and having some type of outlet fitting which receives a conventional tire valve stem. The fitting may include various types of valves which are opened by the tire valve stem to permit the pressure fluid to flow from the pressure vessel to the tire. It is also well known to provide such pressure vessels with a rupturable diaphragm for over pressure relief.

The tire inflator of this invention is of this general type but includes an improved valve assembly which provides a tire fill valve and is severable under over pressure conditions to permit one portion of the valve assembly to move relative to another and allow the pressure fluid from the vessel to flow to atmosphere through ports in the valve assembly.

In the preferred embodiment of the invention, the valve assembly includes a housing secured within an opening of the pressure vessel and a valve body slidable within the housing. The valve body mounts a conventional tire valve which is opened by insertion of the tire valve stem through an apertured outer end wall of the housing to permit the flow of pressure fluid to the tire. The valve body is located relative to the housing and is sealed thereto by a rupturable diaphragm which is secured to concentric raised ribs on the inner ends of the valve body and housing. Under over pressure conditions, the diaphragm ruptures at the area between the valve body and housing and the inner portion of the diaphragm and valve body move into engagement with the outer end wall of the housing. The pressure fluid flows between the valve body and housing to atmosphere through radial ports located in the housing adjacent the outer end wall.

The primary feature of this invention is that it provides a combined tire fill and over pressure relief valve assembly for a tire inflator. Another feature is that the valve assembly includes a slidably related housing and valve body which are normally sealed to each other and located relative to each other by an over pressure rupturable diaphragm. A further feature is that rupture of the diaphragm permits the valve body to move relative to the valve housing to close the tire valve stem opening of the housing and direct the flow of pressure fluid to atmosphere through radial ports in the housing and thereby avoid reaction forces.

These and other features will be readily apparent from the following specification and drawing wherein FIG. 1 is a sectional view of a tire inflator according to this invention.

Referring now to the drawing a tire inflator 10 includes a pressure vessel 12 of conventional type which is filled with carbon dioxide. The pressure vessel includes a tubular outlet 14 at one axial end which is internally threaded. A valve assembly 16 includes an outer valve housing 18 which is externally threaded and is secured within the outlet 14. The thread connection is not necessary in all instances and the valve assembly may be otherwise secured to the pressure vessel such as by welding or brazing.

A valve body 20 is slidably received within an axial bore 22 of the valve housing 18. The valve body includes a shouldered axial bore concentric with bore 22 and mounting a conventional tire stem valve 24. The inner end of the valve housing 18 includes a slightly raised circular rib 26 and the inner end of the valve body includes a like rib 28, the ribs being concentric with each other and being located immediately adjacent each other and to the slight space between the valve body and valve housing. A pressure rupturable diaphragm 30 is welded to the ribs 26 and 28 to locate the valve body within the valve housing and to also seal the space between the valve body and the valve housing. The center of the diaphragm includes a circular cut-out 32 to permit movement of the plunger of the valve 24 relative to the diaphragm and also flow from the pressure vessel through the valve body to the tire.

The valve housing 18 includes an outer end wall 34 provided with a center aperture 36 to permit the inflator 10 to be threaded to the conventional tire valve stem (not shown). The conventional stem is externally threaded and is threaded into a portion 38 of the axial bore of the valve body 20 and into engagement with an O-ring seal 40 to provide a seal between the valve body 20 and the tire valve stem. The plunger of the tire valve (not shown) engages the depressible plunger 42 of valve 24 as the inflator 10 is threaded on to the tire valve stem to open both the valve 24 and the valve of the tire valve to permit the flow of pressure fluid from the inflator to the tire.

Under over pressure conditions, the diaphragm 30 ruptures opposite the space between the valve stem and valve body. The center severed portion of the diaphragm moves with the valve body 20 outwardly of the inflator or to the right as viewed in FIG. 1 until the outer end of the valve body engages the outer wall 34 of the valve housing. Simultaneously with such movement, the pressure fluid within the pressure vessel flows into the space between the valve body 20 and valve housing 18 and to atmosphere through radial ports 44 provided in the valve housing adjacent the wall 34. The radial ports prevent the occurrence of reverse thrust.

Although FIG. 1 and the description show the diaphragm 30 being welded to the valve body 20 and the valve housing 18 by means of concentric projections 26 and 28, it should be understood that the diaphragm may be assembled by other means such as election beam welding, brazing, glueing, or clamping.

It is claimed:

1. A tire inflator comprising a pressure vessel containing pressure fluid and having an opening, a housing secured within the opening and including an axial bore opening through the inner end of the housing to the pressure vessel and opening through the outer end of the housing to atmosphere, the housing including a plurality of radial ports adjacent the outer end thereof opening to the axial bore and to atmosphere, a valve body slidably received within the axial bore of the housing in radially spaced relationship to the bore wall, the valve body including an axial bore opening through the inner end of the valve body to the pressure vessel and opening through the outer end of the valve body to atmosphere through the outer end of the housing, normally closed valve means mounted within the bore of the valve body to control fluid flow from the pressure vessel through the valve body to a tire, a fluid pressure rupturable diaphragm bridging the radial space between the inner ends of the valve body and of the housing and having an opening therethrough to the axial bore of the valve body, means securing the diaphragm to the inner ends of the valve body and of the housing to locate the valve body within the axial bore of the housing and seal the radial space between the inner ends of the valve body and of the housing to thereby normally limit fluid flow between the pressure vessel and the tire through the normally closed valve means, the valve means being opened by insertion of a tire valve within the housing to permit the flow of pressure fluid from the pressure vessel to a tire for inflation thereof, the occurrence of pressure within the pressure vessel exceeding a predetermined limit acting against the inner end of the valve body and forcing the valve body outwardly within the axial bore of the housing to rupture the diaphragm between the inner ends of the valve body and of the housing and permit the flow of pressure fluid from the pressure vessel through the radial space between the valve body and valve housing and to atmosphere through the radial ports, and means locating the valve body outwardly within the axial bore of the housing in a position closing the outer end of the axial bore of the housing to prevent fluid flow therethrough to atmosphere and thereby prevent reverse thrust of the pressure vessel.

2. A tire inflator comprising a pressure vessel containing pressure fluid and having an opening, a housing secured within the opening and including an axial bore opening through the inner end of the housing to the pressure vessel and opening to atmosphere through a radial flange at the outer end of the housing, the housing including a plurality of radial ports adjacent the outer end thereof opening to the axial bore and to atmosphere, a valve body slidably received within the axial bore of the housing in radially spaced relationship to the bore wall, the valve body including an axial bore opening through the inner end of the valve body to the pressure vessel and opening through the outer end of the valve body to atmosphere through the outer end of the housing, normally closed valve means mounted within the bore of the valve body to control fluid flow from the pressure vessel through the valve body to a tire, a fluid pressure rupturable diaphragm bridging the radial space between the inner ends of the valve body and of the housing and having an opening therethrough to the axial bore of the valve body, means securing the diaphragm to the inner ends of the valve body and of the housing to locate the valve body within the axial bore of the housing and seal the radial space between the inner ends of the valve body and of the housing to thereby normally limit fluid flow between the pressure vessel and the tire through the normally closed valve means, the valve means being opened by insertion of a tire valve within the housing to permit the flow of pressure fluid from the pressure vessel to a tire for inflation thereof, the occurrence of pressure within the pressure vessel exceeding a predetermined limit acting against the inner end of the valve body and forcing the valve body outwardly within the axial bore of the housing and into engagement with the radial flange to rupture the diaphragm between the inner ends of the valve body and of the housing and permit the flow of pressure fluid from the pressure vessel through the radial space between the valve body and valve housing and to atmosphere through the radial ports, the radial flange locating the valve in a position closing the flange opening to prevent fluid flow therethrough to atmosphere and thereby preventing reverse thrust of the pressure vessel.

* * * * *